June 20, 1961    N. WESTHEIMER    2,989,673
CONTROL MECHANISM FOR SERVO SYSTEMS
Filed Jan. 15, 1958
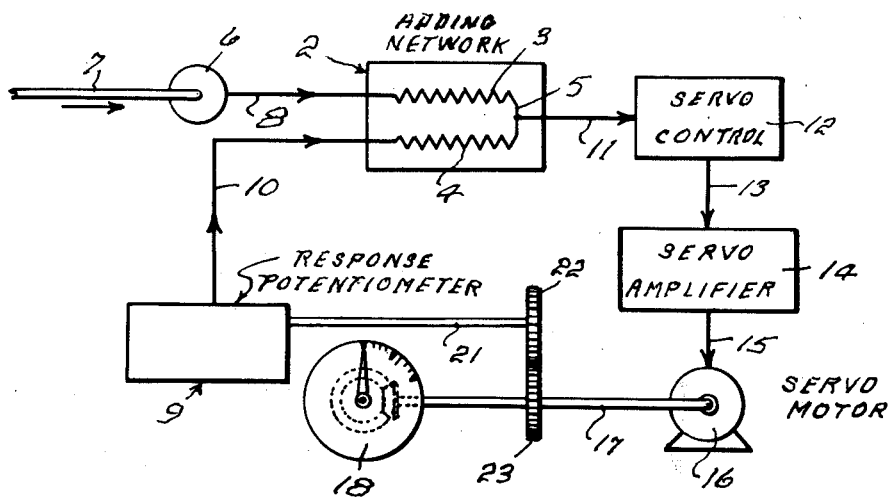
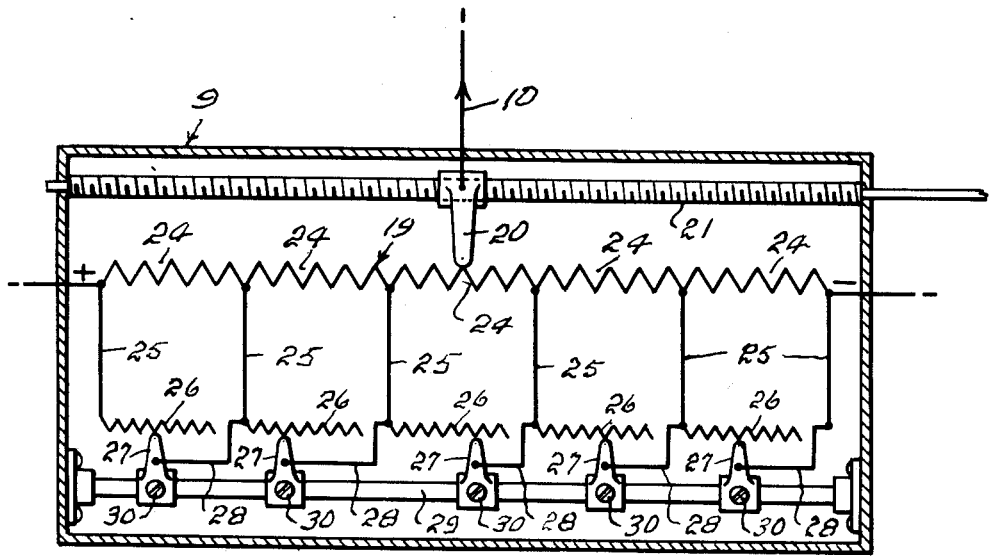
INVENTOR
Norbert Westheimer
ATTORNEY

United States Patent Office 2,989,673
Patented June 20, 1961

2,989,673
CONTROL MECHANISM FOR SERVO SYSTEMS
Norbert Westheimer, Forest Hills, N.Y., assignor to Sperry Rand Corporation, Ford Instrument Company Division, Long Island City, N.Y., a corporation of Delaware
Filed Jan. 15, 1958, Ser. No. 709,727
4 Claims. (Cl. 318—28)

This invention relates to a control mechanism for servo systems by means of which a correct linear output mechanical quantity may be obtained from a mechanical input quantity, and this application is a continuation-in-part of my copending application Serial No. 615,599 which was filed October 12, 1956.

In systems of this general character a mechanical quantity is imparted to a rate generator and the electrical output of the rate generator is imparted through a servo controller to a servo amplifier by which a servo motor is driven, the mechanical output of which is the required quantity. The servo motor also drives a feed-back potentiometer from which a feed-back voltage which is dependent on the operation of the servo motor is fed back and algebraically added by an adding network to the electrical output of the rate generator. When the feed-back voltage from the feed-back potentiometer is equal to the input voltage from the rate generator the output of the adding network is nulled, thereby stopping the operation of the servo motor until a different voltage is imparted to the adding network by the rate generator. As long as the output voltage of the rate generator is linear it can be combined with a similar linear feed-back voltage from the feed-back potentiometer to null the output of the adding network until a different voltage is imparted thereto by the rate generator. But due to inherent inaccuracies in the operation of most rate generators the voltage outputs thereof vary slightly from linearity so that the output is slightly wavy instead of linear, which prevents the combining of a linear feed-back voltage therewith to null the output of the adding network whereby the mechanical output of the servo motor is in error. In order to correct this inherent inaccuracy in a rate generator, which may be measured, I provide the feed-back potentiometer with a plurality of adjustable loading resistors and connect them by equispaced taps to the potentiometer resistor. The loading resistors are first manually adjusted and set in accordance with the previously measured divergence of the rate generator from linearity but opposed thereto. The output of the potentiometer will then have the same non-linearity but opposed to the non-linear output of the rate generator so that the combined electrical output of the rate generator and the potentiometer is null, and therefore the mechanical output of the servo motor.

The principal object of the invention is to provide in a servo system of the aforesaid character means by which the variations from linearity of the electrical output of a rate generator are automatically compensated for so that the mechanical output of the servo motor will be correct.

Having stated the principal object of the invention, other and more limited objects of the invention will be apparent from the following specification and the accompanying drawings forming a part thereof in which:

FIG. 1 is a diagrammatic layout of a servo system having my invention incorporated therein; and FIG. 2 is a diagrammatic view schematically illustrating the construction of a potentiometer having a plurality of adjustable loading resistors connected in equispaced relation to the potentiometer resistor between the ends thereof.

Referring now to the drawings in detail by reference characters, the FIG. 1 indicates generally a conventional servo system having my invention incorporated therein, and which comprises a conventional adding network 2 having a pair of similar resistor legs 3 and 4 which are connected together as shown at 5. A mechanical quantity is imparted to a rate generator 6 by a shaft 7 and the electrical output of the rate generator 6 is imparted through a conductor 8 to the resistor 3 of the adding network 2. The electrical output of a feed-back potentiometer 9 is fed back to the resistor 4 of the adding network 2 through a conductor 10. The electrical output of the adding network 2, which is the combined output of the rate generator 6 and the potentiometer 9, is fed through a conductor 11 to a servo control mechanism 12, which is provided to stabilize the servo motor 16, and through a conductor 13 to a servo amplifier 14. The output of the servo amplifier 14 is supplied through a conductor 15 to the servo motor 16. The mechanical output of the servo motor 16 through its armature shaft 17 is imparted to a dial 18 or other mechanism, such as a computer or the like, with which the servo mechanism 1 is associated.

The potentiometer 9 is of conventional construction and comprises a resistance element 19 which is adapted to have a source of voltage connected thereto, and a shiftable takeoff finger 20 which is movable back and forth along the resistance element 19 and is connected to the conductor 10 through which the output of the potentiometer is fed back to the resistor 4 of the adding network 2. The finger 20 is mounted upon an elongated screw shaft 21 which is connected by gears 22 and 23 to the armature shaft 17 of the servo motor 16. The takeoff finger is therefore shifted along the potentiometer resistance element in accordance with the mechanical output of the servo motor 16.

As previously stated, as long as the output of the rate generator 6 is linear there will be no error in the output of the servo motor, but if the output of the rate generator deviates from linearity there will be a corresponding error in the output of the servo motor. But with most, if not all, rate generators the electrical output varies slightly from linearity so that the graph of the output is slightly wavy instead of linear, as a consequence of which the voltage applied to the resistor 3 of the adding network, by the rate generator 6, is not equal and opposed to the voltage applied to the resistor 4 of the adding network by the potentiometer. And as previously stated the variations from linearity of the output of the rate generator can be measured and plotted.

In order to make the output of the potentiometer 9 equal and opposed to the output of the rate generator 6 I divide the potentiometer resistance 19 into a plurality of equal increments 24 by a plurality of taps 25; and I connect an adjustable loading resistance means to each of the increments 24 by the taps 25. Each loading resistance means comprises a resistor 26 which is connected to one of the taps 25 and an adjusted contact takeoff arm 27 which is connected to the next succeeding tap 25 by a lead 28. The contact arms 27 are all adjustably mounted on a fixed bar or rod 29, from which they are suitably insulated, and are adapted to be secured in fixed adjusted positions by set screws 30. The takeoff positions of the contact arms 27 with respect to the associated resistor 26 are all adjusted and set in accordance with the previously plotted graph of the non-linear output of the rate generator 6, thereby loading each increment 24 more or less in accordance with the graph. The non-linear voltage fed back from the potentiometer to the adding network will therefore counteract the non-linear output of the rate generator 6 so that the output from the adding network 2 to the servo motor 16 will be null when the input and feed-back voltages are the same.

From the foregoing it will be apparent to one skilled in this art that I have provided a very simple and effective mechanism for accomplishing the objects of the invention.

It is to be understood that I am not limited to the specific construction shown and described herein as various modifications may be made therein within the spirit of the invention and the scope of the appended claims.

I claim:

1. A servo system of the character described comprising a rate generator having a known non-linear output voltage, means by which said rate generator is driven in accordance with a quantity mechanically imparted thereto, an adding network having a pair of similar resistors which are connected together at the output ends thereof, conductor means through which the electrical output of said rate generator is imparted to the input end of one of said resistors, a feed-back potentiometer and conductor means through which the electrical output of said potentiometer is imparted to the input end of the other of said resistors, a servo amplifier and conductor means through which the combined output of said pair of resistors is imparted to said servo amplifier, a servo motor having an armature shaft which is adapted to be driven by the electrical output of said servo amplifier, means by which the mechanical output of said servo motor is imparted to an associated mechanism which is adapted to be actuated by said servo-motor, mechanical takeoff means by which said potentiometer is driven by said armature means, and compensating means by which a non-linearity similar to but opposed to the known non-linearity in the output of said rate generator may be imparted to the output of said potentiometer whereby the output of said adding network will be rendered null when the output voltages of the rate generator and the feedback potentiometer are equal.

2. A servo system as defined in claim 1 in which said compensating means comprises mechanisms by which successive increments of the resistance element of said potentiometer are variously loaded in accordance with a known non-linearity in the output of said rate generator.

3. A servo system as defined in claim 1 in which said compensating means comprises a plurality of adjustable loading resistors which are connected to successive increments of the resistance element of said potentiometer and are adapted to be adjusted in accordance with a known non-linearity in the output of said rate generator.

4. A servo system as defined in claim 1 in which said compensating means comprises a plurality of taps by which the resistance element of said potentiometer is divided into a plurality of successive increments, a plurality of resistance elements one of which is connected to each of said taps, and an adjustable contact arm associated with each of said resistance elements and connected to the next succeeding tap.

References Cited in the file of this patent

UNITED STATES PATENTS

| | | |
|---|---|---|
| 2,449,035 | Coffin et al. | Sept. 7, 1948 |
| 2,632,038 | Hofstadter | Mar. 17, 1953 |
| 2,671,875 | Urbanik | Mar. 9, 1954 |
| 2,760,131 | Braunagle | Aug. 21, 1956 |
| 2,783,421 | Hering | Feb. 26, 1957 |